(No Model.) 2 Sheets—Sheet 1.
W. GRIBBEN.
FEED REGULATOR.
No. 443,139. Patented Dec. 23, 1890.
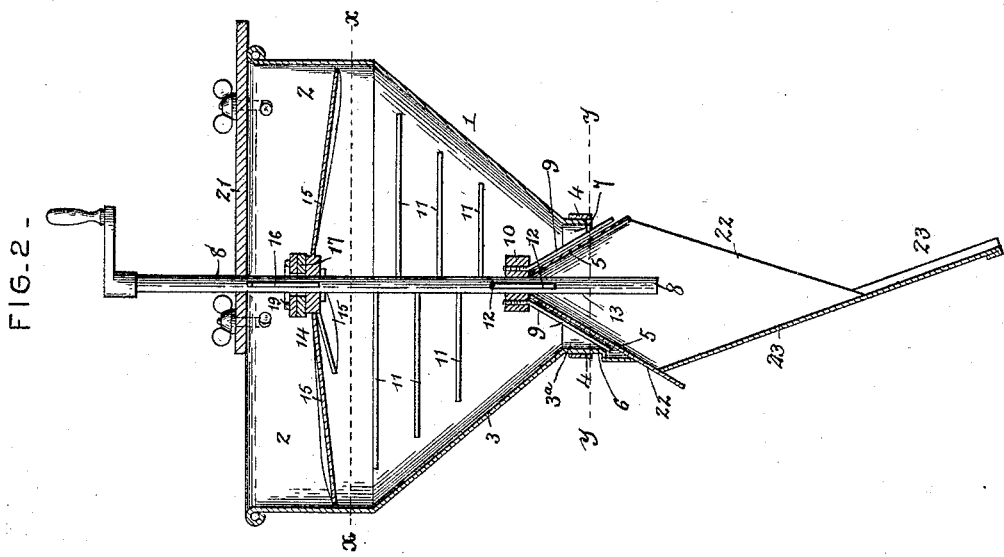
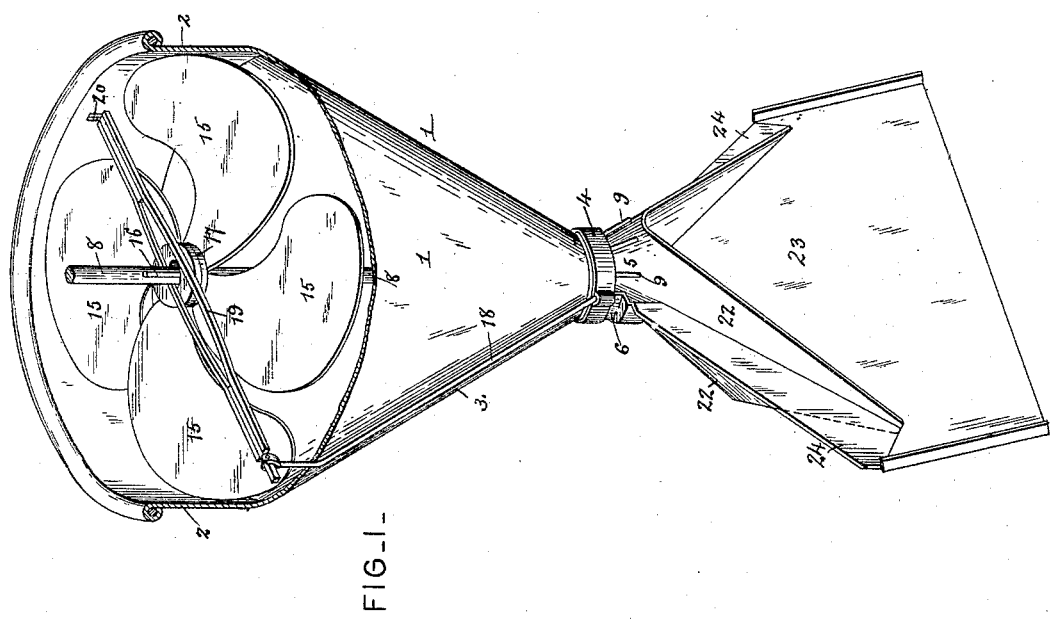
Witnesses  Inventor
Jas. K. McCathran  William Gribben
N. T. Riley  By his Attorneys,
 C. A. Snow & Co.
THE NORRIS PETERS CO., PHOTO-LITHO., WASHINGTON, D. C.

(No Model.) 2 Sheets—Sheet 2.
W. GRIBBEN.
FEED REGULATOR.
No. 443,139. Patented Dec. 23, 1890.
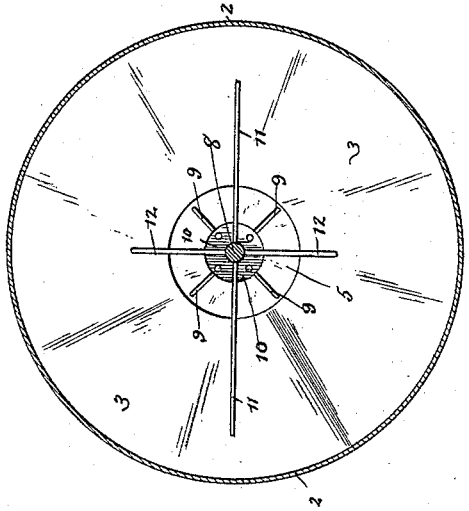
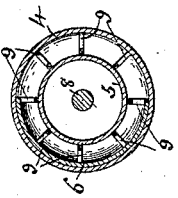
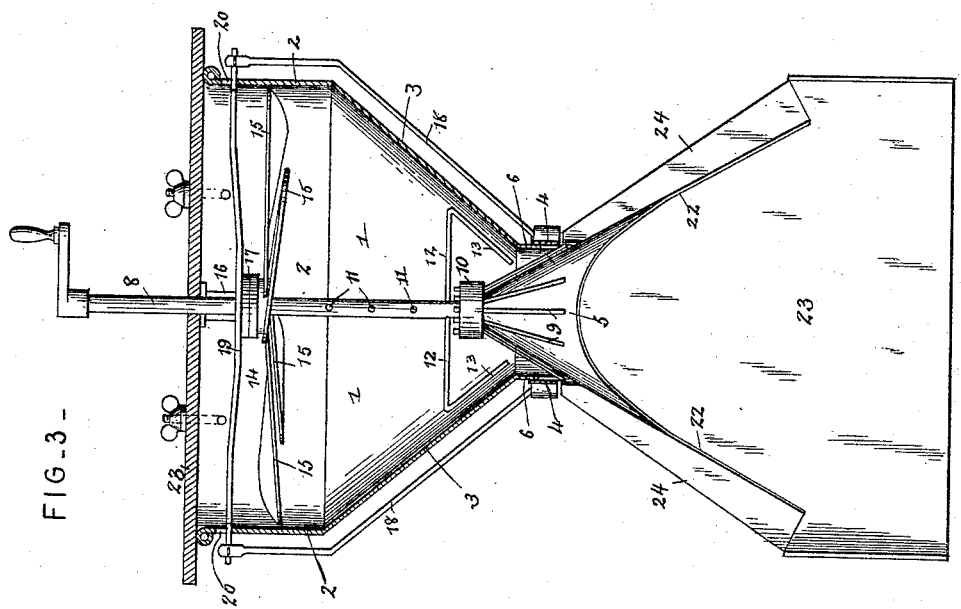
Witnesses
Jas. K. McCathran
H. F. Riley
Inventor
William Gribben
By his Attorneys,
C. A. Snow & Co.

UNITED STATES PATENT OFFICE.

WILLIAM GRIBBEN, OF CROSWELL, MICHIGAN, ASSIGNOR OF ONE-FOURTH TO JOSEPH M. GAIGE, OF SAME PLACE.

FEED-REGULATOR.

SPECIFICATION forming part of Letters Patent No. 443,139, dated December 23, 1890.

Application filed June 17, 1890. Serial No. 355,762. (No model.)

*To all whom it may concern:*

Be it known that I, WILLIAM GRIBBEN, a citizen of the United States, residing at Croswell, in the county of Sanilac and State of Michigan, have invented a new and useful Feed-Regulator, of which the following is a specification.

The invention relates to improvements in feed-regulators.

The object of the present invention is to provide a simple and inexpensive device for feeding to roller-process flouring-mills, capable of automatically controlling the feed according to the bulk of the material within the hopper.

A further object of the invention is to provide a device in which the feed can be automatically controlled by the material within the hopper or by the operator.

The invention consists in the construction and novel combination and arrangement of parts hereinafter fully described, illustrated in the accompanying drawings, and pointed out in the claims hereto appended.

In the drawings, Figure 1 is a perspective view of a feeder constructed in accordance with this invention, a portion of the hopper being broken away to illustrate the disposition of the feeding mechanism. Fig. 2 is a vertical sectional view of the same. Fig. 3 is a similar view taken at right angles to Fig. 2, the conical distributer and the deflector being illustrated in elevation. Fig. 4 is a horizontal sectional view on line $x$ $x$ of Fig. 2. Fig. 5 is a transverse section on the line $y$ $y$ of Fig. 2.

Referring to the accompanying drawings, 1 designates a hopper of approximately conical shape and consisting of an upper cylindrical portion 2 and a lower conical portion 3, having an open circular bottom $3^a$, provided with a collar 4, in which bottom $3^a$ is secured a conical distributer 5, arranged concentrically with the movable collar 4, and secured to the bottom $3^a$ is a semi-cylindrical band 6, extending around and closing the back of the collar and forming a semicircular feed-opening 7 at the lower front end of the hopper. The conical distributer extends upward within the hopper, and is constructed of steel and has centrally journaled within it a vertical shaft 8, provided with downwardly-extending radial fingers 9, arranged to engage the outer face of the conical distributer and cause the material to pass through the semicircular feed-opening 7, and the upper ends of the fingers 9 are fastened to a disk 10, rigidly secured to the central vertical shaft 8 and bearing upon the apex of the conical distributer. The central shaft is provided above the disk and within the conical portion of the hopper with radial agitator arms or wings 11 and 12, and the latter are provided at their ends with inwardly-inclined portions 13, arranged parallel with the inclined side of the conical portion of the hopper and adapted to thoroughly stir the material before passing to the conical distributer and prevent clogging. A screw 14, provided with inclined blades 15, is secured by splines 16 to the shaft 8 in the upper portion of the hopper, and is adapted to engage the material and force the same downward, and is loosely mounted upon the central shaft and is adapted to be moved vertically by the material coming in contact with the inclined blades. The blades are connected with a sliding sleeve 17, arranged upon the shaft at the upper end of the hopper and connected with the collar 4 and adapted to partially close the feed-opening and regulate the discharge of the material, so that when there is a large bulk of material within the hopper the screw is raised and the discharge-opening increased in size by the consequent movement of the collar 4, and as the bulk decreases the screw descends, carrying with it the collar 4 and partially closing the feed-opening. It will thus readily be seen that the discharge is automatically regulated by the bulk of the material within the hopper. The collar 4 is connected to the lower ends of rods 18, arranged upon opposite sides of the hopper and conforming to the configuration thereof, and having their upper ends connected by a cross-bar 19, loosely arranged upon the shaft and having its ends extending through slots 20 of the hopper and pivoted in the bifurcated upper end of the rods 18.

When it is desired to have the feed controlled by the operator instead of being automatically controlled by the screw, the ends of the side rods 18 are released from the cross-bar and connected with set-screws designed to pass through the cover 21.

The conical distributer 5 is provided with lateral extensions 22, extending downward and forming a continuation of the cone and having secured at one side of them an inclined deflector 23, which extends beyond the opposite side of them to direct the material to the rollers, and the said extensions 22 are provided with flanges 24, which direct the material to the deflector and prevent it falling back of the same.

From the foregoing description and the accompanying drawings the construction, operation, and advantages of the invention will be readily understood.

Having thus described my invention, what I claim is—

1. In a feeder, the combination of the hopper provided at its lower end with the band 6, forming a semicircular opening, the conical distributer, the inclined flanges 24, arranged on the conical distributer, and the inclined deflector arranged beneath the distributer and adapted to direct the material in a sheet, substantially as described.

2. In a feeder, the combination of the hopper, the band 6, the stationary conical distributer having lateral extensions 22, forming continuations of it and provided with flanges 24, arranged along the extension, and the inclined deflector secured to and connecting the extensions at one side and depending below the extensions at the other side, substantially as described.

3. The combination of the hopper provided at its lower end with the collar, the conical distributer arranged at the bottom of the hopper and secured thereto, the band closing the back of the hopper and forming a semicircular discharge-opening, the sliding sleeve arranged upon the collar and adapted to vary the size of the discharge-opening, the central vertical shaft, the screw arranged upon the shaft and capable of vertical movement, and being connected with and operating with the sliding sleeve, substantially as described.

4. The combination of the hopper having an open bottom and provided with a collar, the conical distributer arranged concentric with the collar and secured thereto, the band closing the back of the hopper and forming a semicircular discharge-opening, the central vertical shaft, the sliding sleeve arranged upon the said collar, the screw vertically movable on the shaft, the cross-bar arranged to be engaged by the screw and having its ends extending through the sides of the hopper, and the rods 18, connecting the cross-bar and the sliding sleeve, substantially as described.

5. In a feeder, the hopper, the band 6, the stationary conical distributer having its apex arranged within the bottom of the hopper, the series of rotary inclined fingers working flat against the exterior face of the apex of the conical distributer, the inclined flanges 24 at the sides of the distributer, and the deflector secured to the distributer and extending below the same, as set forth.

6. In a feeder, the combination of the hopper, the central rotary shaft, the inclined blades 15, loosely mounted on the shaft, so as to rise and fall by the increase or decrease of the material in the hopper, and the collar 4, connected with the blades and operated thereby, as set forth.

7. In a feeder, the combination of the hopper having a conical distributer 5 arranged in the mouth of the hopper, and the band 6, partially closing the space between the mouth of the hopper and the distributer, so as to provide a semicircular feed-opening 7, the central rotary shaft, the inclined blades 15, loosely mounted on the shaft, so as to rise and fall by the increase or decrease of the material in the hopper, and the exterior collar 4, the exteriorly-arranged rods 18, and the cross-bar 19, resting above and operated by the blades, as set forth.

8. The combination of the hopper provided at its lower end with the band 6, closing the back of the hopper and forming a semicircular discharge-opening, the conical distributer arranged at the bottom of the hopper and secured thereto, the sliding collar 4, arranged on the band 6 to vary the size of the discharge-opening, and suitable means for controlling the sliding sleeve, substantially as described.

In testimony that I claim the foregoing as my own I have hereto affixed my signature in presence of two witnesses.

WILLIAM GRIBBEN.

Witnesses:
J. M. GAIGE,
J. J. BINKS.